(12) United States Patent
Lacy et al.

(10) Patent No.: US 9,931,814 B2
(45) Date of Patent: *Apr. 3, 2018

(54) ARTICLE AND METHOD FOR MAKING AN ARTICLE

(71) Applicant: GENERAL ELECTRIC COMPANY, Schenectady, NY (US)

(72) Inventors: Benjamin Paul Lacy, Greenville, SC (US); David Edward Schick, Greenville, SC (US); Srikanth Chandrudu Kottilingam, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 629 days.

This patent is subject to a terminal disclaimer.

(21) Appl. No.: 14/496,828

(22) Filed: Sep. 25, 2014

(65) Prior Publication Data

US 2016/0089859 A1    Mar. 31, 2016

(51) Int. Cl.

| | |
|---|---|
| *B22F 3/105* | (2006.01) |
| *B32B 15/01* | (2006.01) |
| *B22F 3/24* | (2006.01) |
| *B22F 7/08* | (2006.01) |
| *B23K 26/34* | (2014.01) |
| *B23K 26/00* | (2014.01) |
| *B23K 35/30* | (2006.01) |

(Continued)

(52) U.S. Cl.
CPC ............ *B32B 15/01* (2013.01); *B22F 3/1055* (2013.01); *B22F 3/24* (2013.01); *B22F 7/08* (2013.01); *B23K 26/0012* (2013.01); *B23K 26/345* (2013.01); *B23K 35/0238* (2013.01); *B23K 35/308* (2013.01); *B23K 35/3046* (2013.01); *B23K 35/3053* (2013.01); *B23K 35/3086* (2013.01); *B22F 2003/248* (2013.01); *B33Y 10/00* (2014.12); *B33Y 80/00* (2014.12)

(58) Field of Classification Search
None
See application file for complete search history.

(56) References Cited

U.S. PATENT DOCUMENTS

| | | |
|---|---|---|
| 6,420,677 B1 | 7/2002 | Emer et al. |
| 6,744,020 B2 | 6/2004 | Shirakawa et al. |

(Continued)

*Primary Examiner* — Jessee R Roe
*Assistant Examiner* — Ngoclan T Mai
(74) *Attorney, Agent, or Firm* — McNees Wallace & Nurick LLC (57) ABSTRACT

An article and a method for making shaped cooling holes in an article are provided. The method includes the steps of providing a metal alloy powder; forming an initial layer with the metal alloy powder, the initial layer having a preselected thickness and a preselected shape, the preselected shape including at least one aperture; sequentially forming an additional layer over the initial layer with the metal alloy powder, the additional layer having a second preselected thickness and a second preselected shape, the second preselected shape including at least one aperture corresponding to the at least one aperture in the initial layer; and joining the additional layer to the initial layer, forming a structure having a predetermined thickness, a predetermined shape, and at least one aperture having a predetermined profile. The structure is attached to a substrate to make the article.

18 Claims, 5 Drawing Sheets

(51) Int. Cl.
*B23K 35/02* (2006.01)
*B33Y 10/00* (2015.01)
*B33Y 80/00* (2015.01)

(56) References Cited

U.S. PATENT DOCUMENTS

| | | |
|---|---|---|
| 7,019,257 B2 | 3/2006 | Stevens |
| 7,147,899 B2 | 12/2006 | Fernihough et al. |
| 7,820,267 B2 | 10/2010 | Fahndrich |
| 8,153,923 B2 | 4/2012 | Beck et al. |
| 8,245,519 B1 | 8/2012 | Liang |
| 2005/0241147 A1 | 11/2005 | Arnold et al. |
| 2006/0054079 A1 | 3/2006 | Withey et al. |
| 2011/0135952 A1* | 6/2011 | Morris .................. B22F 3/1055 428/548 |
| 2011/0284510 A1* | 11/2011 | Reeves-Hall ........ B23K 26/032 219/121.72 |
| 2013/0071562 A1* | 3/2013 | Szuromi ............... B22F 3/1055 427/237 |
| 2014/0169981 A1* | 6/2014 | Bales ........................ B22F 5/04 416/96 R |

\* cited by examiner

ARTICLE AND METHOD FOR MAKING AN ARTICLE

STATEMENT REGARDING FEDERALLY SPONSORED RESEARCH

This invention was made with government support under contract number DE-FC26-05NT42643 awarded by the Department of Energy. The government has certain rights in this invention.

FIELD OF THE INVENTION

The present invention is directed toward an article and a method for making an article. More specifically, the present invention is directed to an article including cooling holes and a method for making cooling holes in an article.

BACKGROUND OF THE INVENTION

Turbine systems are continuously being modified to increase efficiency and decrease cost. One method for increasing the efficiency of a turbine system includes increasing the operating temperature of the turbine system. To increase the temperature, the turbine system must be constructed of materials which can withstand such temperatures during continued use.

In addition to modifying component materials and coatings, one common method of increasing temperature capability of a turbine component includes the use of complex cooling channels. The complex cooling channels are often formed in metals and alloys used in high temperature regions of gas turbines. One current method of forming the complex cooling channels includes costly drilling, such as with a laser or waterjet. Another method of forming the cooling channels includes costly electrical discharge machining.

However, the complex cooling channels can be difficult to form using drilling or electrical discharge machining resulting in increased scrap, which aids in driving up costs. In particular, it is difficult to form shaped holes with the current methods. Furthermore, it is increasingly difficult to form small shaped holes with either drilling or electrical discharge machining.

An article and method with improvements in the process and/or the properties of the components formed would be desirable in the art.

BRIEF DESCRIPTION OF THE INVENTION

In one exemplary embodiment, a method for making shaped cooling holes in an article includes the steps of providing a metal alloy powder; forming an initial layer with the metal alloy powder, the initial layer having a preselected thickness and a preselected shape, the preselected shape including at least one aperture; sequentially forming an additional layer over the initial layer with the metal alloy powder, the additional layer having a second preselected thickness and a second preselected shape, the second preselected shape including at least one aperture corresponding to the at least one aperture in the initial layer; and joining the additional layer to the initial layer, forming a structure having a predetermined thickness, a predetermined shape, and at least one aperture having a predetermined profile.

In another exemplary embodiment, an article includes a metallic substrate, and a structure of additive manufacturing material of predetermined thickness attached to the metallic substrate, the structure having at least one aperture having a predetermined profile. The article further includes a passageway through the structure that includes the at least one aperture and a corresponding metering hole.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are an article having cooling holes and a method of fabricating an article having cooling holes. Embodiments of the present disclosure, in comparison to articles and methods not using one or more of the features disclosed herein, increase aperture complexity, increase cooling hole complexity, increase aperture quality, increase film cooling, decrease cooling hole size, decrease cooling hole manufacturing cost, form shaped cooling holes separate from an article, provide repair cooling holes for attachment to an article, provide increased control over forming advanced features, or a combination thereof.

Figure 1:
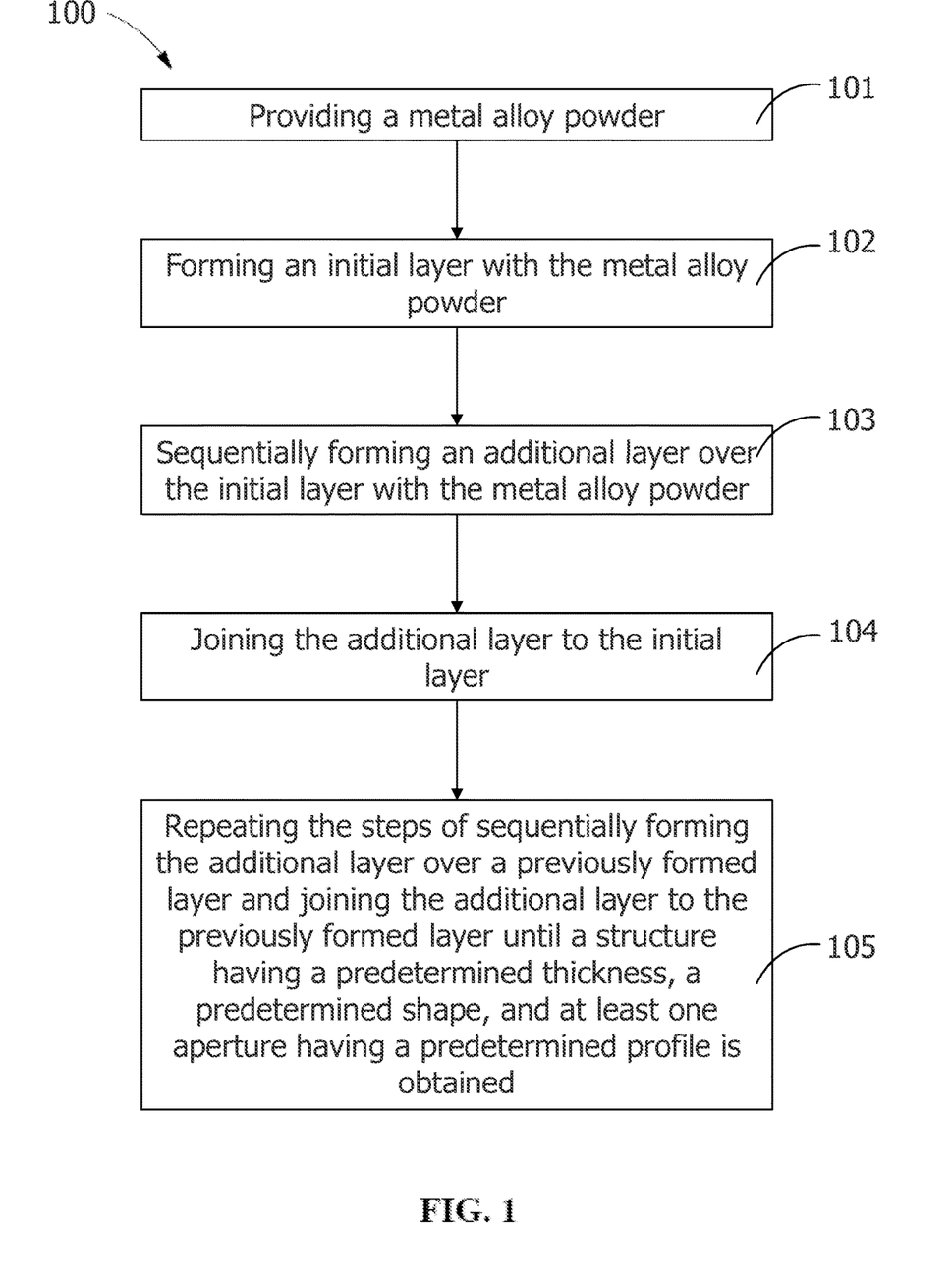
FIG. 1 is a flow chart of a method of making cooling holes.
Figure 2:
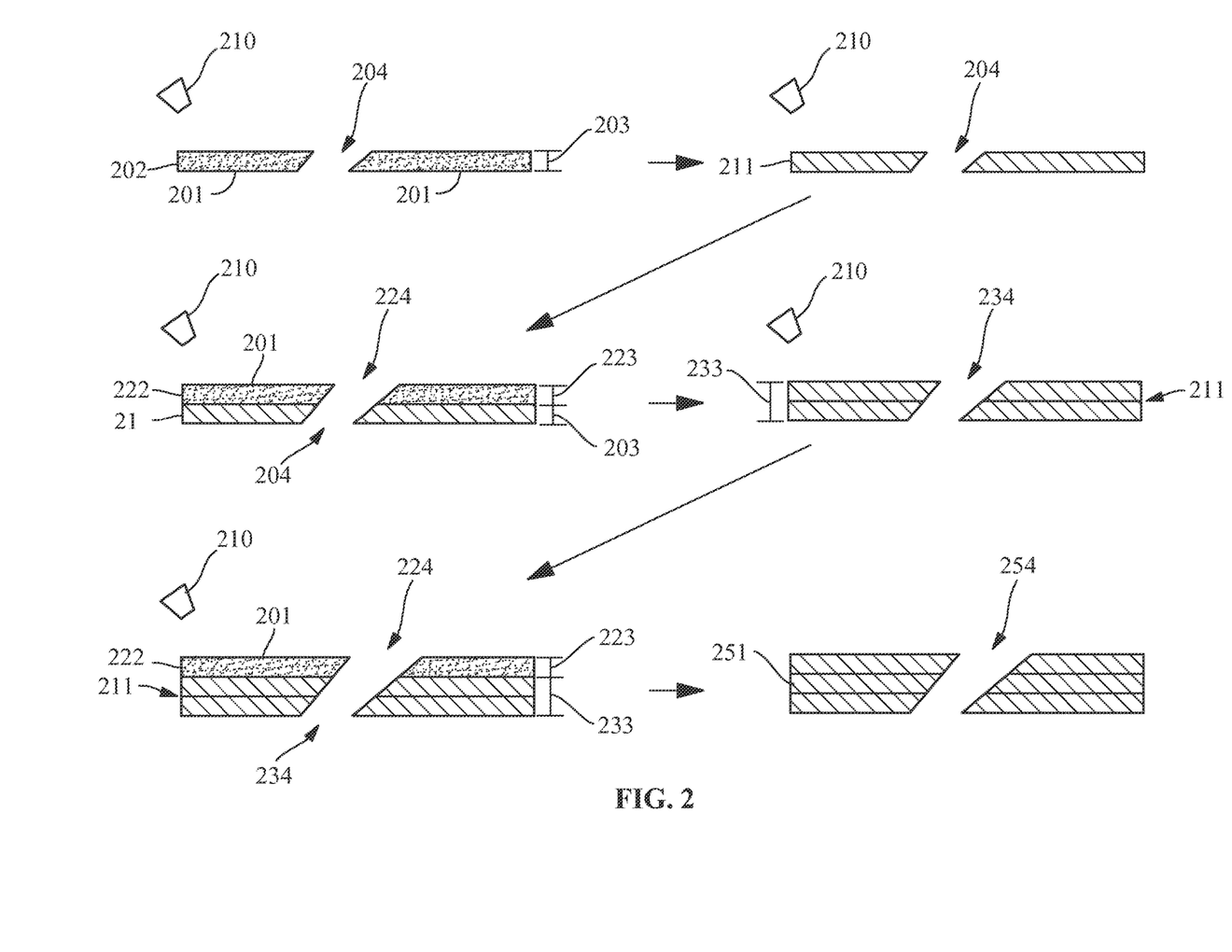
FIG. 2 is a process view of a method of making cooling holes.
Figure 3:
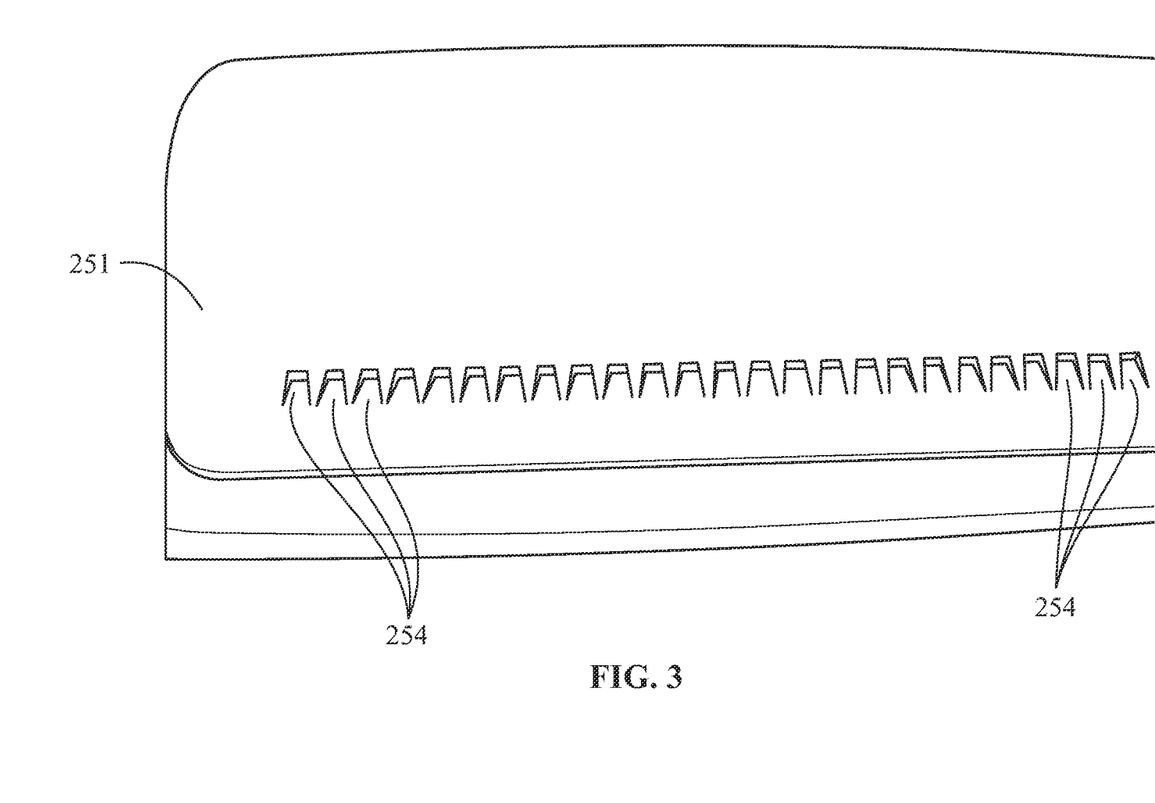
FIG. 3 is a perspective view of cooling holes formed using an additive method.

Referring to FIGS. 1-3, an additive method 100 of making and/or forming net or near-net shape structures is provided. As used herein, the phrase "near-net" refers to a structure 251 being formed with a geometry and size very similar to the final geometry and size of the structure 251, requiring little or no machining and processing after the additive method 100. As used herein, the phrase "net" refers to the structure 251 being formed with a geometry and size requiring no machining and processing. Suitable geometries include, but are not limited to, square, rectangular, triangular, circular, semi-circular, oval, trapezoidal, octagonal, geometrical shapes having features formed therein, any other geometrical shape, or a combination thereof. For example, in one embodiment, the additive method 100 includes making shaped cooling holes in an article. The additive method

100 provides any net or near-net shape to the structure 251, the cooling hole in the structure 251, or any other feature in the structure 251 including an aperture, such as, but not limited to, a metered slot or an angled trench with holes.

The additive method 100 includes any manufacturing method for forming the structure 251 through sequentially and repeatedly depositing and joining material layers. Suitable manufacturing methods include, but are not limited to, the processes known to those of ordinary skill in the art as Direct Metal Laser Melting (DMLM), Direct Metal Laser Sintering (DMLS), Laser Engineered Net Shaping, Selective Laser Sintering (SLS), Selective Laser Melting (SLM), Electron Beam Melting (EBM), Fused Deposition Modeling (FDM), or a combination thereof. In one embodiment, for example, the manufacturing method includes providing a metal alloy powder 201 (step 101); forming an initial layer 202 with the metal alloy powder 201 (step 102); sequentially forming an additional layer 222 over the initial layer 202 with the metal alloy powder 201 (step 103); and joining the additional layer 222 to the initial layer 202 to form the structure 251 (step 104). In another embodiment, the additive method 100 includes repeating the steps of sequentially forming the additional layer 222 over a previously formed layer and joining the additional layer 222 to the previously formed layer (step 105) until the structure 251 having a predetermined thickness, a predetermined shape, and at least one final aperture 254 having a predetermined profile is obtained. The previously formed layer includes any portion 211 of the structure 251 including the initial layer 202 and/or any other additional layer(s) 222 directly or indirectly joined to the initial layer 202.

The initial layer 202 includes a preselected thickness 203 and a preselected shape, which includes at least one first aperture 204. Each of the additional layers 222 includes a second preselected thickness 223 and a second preselected shape, the second preselected shape including at least one second aperture 224 corresponding to the at least one first aperture 204 in the initial layer 202. The second preselected thickness 223 and/or the second preselected shape may be the same, substantially the same, or different between one or more of the additional layers 222. When joined, the preselected thickness 203 of the initial layer 202 and the second preselected thickness 223 of the additional layer(s) 222 form a combined thickness 233 of the portion 211. Additionally, the first aperture 204 and the corresponding second aperture(s) 224 form a combined aperture 234 having a predetermined profile, the combined aperture 234 providing a passage for fluid communication. Once the structure 251 is formed, the at least one combined aperture 234 forms the at least one final aperture 254 having the predetermined profile, and the combined thickness 233 forms the predetermined thickness.

In one embodiment, the additive method 100 includes the DMLM process. In another embodiment, the DMLM process includes providing the metal alloy powder 201 and depositing the metal alloy powder 201 to form an initial powder layer. The initial powder layer has the preselected thickness 203 and the preselected shape including the at least one first aperture 204. In a further embodiment, the DMLM process includes providing a focused energy source 210, and directing the focused energy source 210 at the initial powder layer to melt the metal alloy powder 201 and transform the initial powder layer to the portion 211 of the structure 251.

Suitable focused energy sources include, but are not limited to, laser device, an electron beam device, or a combination thereof. The laser device includes any laser device operating in a power range and travel speed for melting the metal alloy powder 201, such as, but not limited to, a fiber laser, a $CO_2$ laser, or a ND-YAG laser. In one embodiment, the power range includes, but is not limited to, between 125 and 500 watts, between 150 and 500 watts, between 150 and 400 watts, or any combination, sub-combination, range, or sub-range thereof. In another embodiment, the travel speed includes, but is not limited to, between 400 and 1200 mm/sec, between 500 and 1200 mm/sec, between 500 and 1000 mm/sec, or any combination, sub-combination, range, or sub-range thereof. For example, in a further embodiment, the focused energy source 210 operates in the power range of between 125 and 500 watts, at the travel speed of between 400 and 1200 mm/sec for one to three contour passes. In another embodiment, the focused energy source 210 includes a hatch spacing of between about 0.08 mm and 0.2 mm.

Next, the DMLM process includes sequentially depositing additional metal alloy powder 201 over the portion 211 of the structure 251 to form the additional layer 222 having the second preselected thickness 223 and the second preselected shape including the at least one second aperture 224 corresponding to the at least one first aperture 204 in the initial powder layer 202. After depositing the additional layer 222 of the metal alloy powder 201, the DMLM process includes melting the additional layer 222 with the focused energy source 210 to increase the combined thickness 233 and form the at least one combined aperture 234 having a predetermined profile.

The steps of sequentially depositing the additional layer 222 of the metal alloy powder 201 and melting the additional layer 222 may then be repeated to form the net or near-net shape structure 251. For example, the steps may be repeated until the structure 251 having the predetermined thickness, the predetermined shape, and the at least one final aperture 254 having a predetermined profile is obtained. The structure 251 includes a density of, for example, between 90% and 100%, between 95% and 99%, between 98% and 99%, between 99% and 99.8%, or any combination, sub-combination, range, or sub-range thereof.

After repeating the sequentially depositing and melting steps, the structure 251 is hot isostatic pressed (HIP'd), solution heat treated (solutionized), and/or stress relieved. For example, in one embodiment, the structure 251 is HIP'd for 3-5 hours at an elevated temperature of between 1149° C. and 1260° C. (2100° F. and 2300° F.), and an elevated pressure of between 68.95 MPa and 137.9 MPa (10,000 PSI and 20,000 PSI). The HIP'ing further consolidates the structure 251 to increase the density of the structure 251 from, for example, between about 98% and 100% to between about 99.5% and 99.8%. In a further embodiment, in addition to HIP'ing, the structure 251 may be solution heat treated (solutionized) for 1-2 hours in vacuum at an elevated temperature of between 1093° C. and 1205° C. (2000° F. and 2200° F.). The elevated temperature includes any temperature sufficient for distributing segregated alloying elements within the structure 251. In another embodiment, the structure 251 is heat treated for 1-3 hours in vacuum at an elevated temperature of between 1038° C. and 1149° C. (1900° F. and 2100° F.). It will be recognized by those skilled in the art that HIP'ing temperatures and heat treat temperatures will be highly dependent on the composition of the powders and the desired properties.

The preselected thickness 203 of the initial layer 202 and the second preselected thickness 223 of each of the additional layers 222 includes a thickness in the range of 20-100 µm (0.0008-0.004 inches), 20-80 µm (0.0008-0.0032 inches), 40-60 µm (0.0016-0.0024 inches), or any other combination, sub-combination, range, or sub-range thereof. The preselected thickness 203 is equal to or dissimilar from the second preselected thickness 223, which is varied or maintained for each of the additional layers 222. The predetermined thickness of the structure 251 is formed from the preselected thickness 203 of the initial powder layer 202 and the second preselected thickness 223 of each of the additional layers 222. Based upon the preselected thickness 203, the second preselected thickness 223, and/or how many of the additional layers 222 are deposited, the predetermined thickness of the structure 251 includes any suitable thickness in the range of 250-350000 µm (0.010-13.78 inches), 250-200000 (0.010-7.87 inches), 250-50000 µm (0.010-1.97 inches), 250-6350 µm (0.010-0.250 inches), or any combination, sub-combination, range, or sub-range thereof.

In one embodiment, the additive method 100 includes the EBM process. In another embodiment, the EBM process includes providing the metal alloy powder 201 and depositing the metal alloy powder 201 to form the initial powder layer. An electron beam device is then selectively directed at the initial powder layer to melt one or more sections of the metal alloy powder 201 within the initial powder layer, forming the initial layer 202. The initial layer 202 includes the preselected thickness 203 and the preselected shape, which includes the at least one first aperture 204. After forming the initial layer 202, the additional metal alloy powder 201 is sequentially deposited over the initial layer 202 to form the additional powder layer. One or more sections of the additional powder layer are then selectively melted by the electron beam device, forming the additional layer 222 joined to the initial layer 202 and/or any other previously formed additional layers 222. The additional layer 222 includes the second preselected thickness 223 and the second preselected shape, which includes the at least one second aperture 224 corresponding to the at least one first aperture 204 in the initial layer 202. The initial layer 202 and any additional layer(s) 222 form at least a portion of the net or near-net shape structure, such as, but not limited to, the structure 251 having the at least one final aperture 254.

Suitable electron beam devices include any electron beam device operating in a power range and travel speed for melting the metal alloy powder 201. In one embodiment, the power range includes, but is not limited to, between 100 and 4,000 watts, between 150 and 3,500 watts, between 200 and 3,000 watts, or any combination, sub-combination, range, or sub-range thereof. In another embodiment, the travel speed includes, but is not limited to, between 300 and 3,000 mm/sec, between 350 and 2,500 mm/sec, between 400 and 2,000 mm/sec, or any combination, sub-combination, range, or sub-range thereof. For example, in a further embodiment, the electron beam device operates in the power range of between 200 and 3,000 watts, at the travel speed of between 400 and 2,000 mm/sec. In another embodiment, the electron beam device includes a beam diameter of between about 50 and 500 µm, between about 100 and 400 µm, between about 150 and 300 µm, or an combination, sub-combination, range, or sub-range thereof.

A powder size of the metal alloy powder 201 includes, but is not limited to, between about −325 mesh and +10 µm (0.01 and 0.044 mm). In one embodiment, the EBM process includes a weld bead width of between about 0.25 and 0.75 mm, between about 0.25 and about 0.5 mm, between about 0.3 and 0.5 mm, or any combination, sub-combination, range, or sub-range thereof. In another embodiment, the initial powder layer 202 and/or any additional powder layers 222 formed in the EBM process include a thickness of between 10 and 300 µm, between 15 and 250 µm, between 20 and 200 µm, or any combination, sub-combination, range, or sub-range thereof. In a further embodiment, the initial powder layer 202 and at least one of the additional powder layers 222 includes a similar, substantially similar, or different thickness.

In one embodiment, the additive method 100 includes the laser engineered net shaping process. In another embodiment, the laser engineered net shaping process includes providing a stage, providing a laser deposition assembly, and depositing one or more sequential layers of molten powdered material to form the net or near-net shape structure. In a further embodiment, the laser engineered net shaping process is performed within an enclosure, such as, but not limited to, a hermetically sealed enclosure providing atmosphere control that increases material quality.

The laser deposition assembly includes a powder delivery assembly and the focused energy source 210. The powder delivery assembly includes one or more powder delivery nozzles and one or more material feeders. The one or more material feeders deliver the metal alloy powder 201 and/or any other powder material to the one or more powder delivery nozzles, which direct the powder material towards the stage. The focused energy source 210 concurrently directs a focused energy beam towards the stage, the focused energy beam and the powder material intersecting at a point of deposition on or adjacent to the stage. The powder material is either melted by the focused energy beam during the directing of the powder material, or upon contacting a molten pool of powdered material formed by the focused energy beam.

During the directing of the powder material and the focused energy source 210, the laser deposition assembly and/or the stage are moved relative to each other to move the point of deposition and form one or more weld beads. To provide relative movement, the stage may be fixed and the laser deposition assembly may be moved, the laser deposition assembly may be fixed and the stage may be moved, or both the laser deposition assembly and the stage may be moved independently of each other. For example, in one embodiment, the stage includes three or more axes of rotation for moving relative to the laser deposition assembly. In another embodiment, movement of the stage and/or the laser deposition assembly is controlled by software configured to automate the process and/or form the structure based upon a computer-aided design (CAD) model. In a further embodiment, closed loop controls provide increased control over microstructure and material properties.

The relative movement of the laser deposition assembly and/or the stage provides an orientation and/or geometry of each of the weld beads. As the one or more weld beads cool they are secured to one or more adjacent weld beads to form one or more joined layers of molten powdered material. For example, in one embodiment, the laser engineered net shaping process includes depositing a layer of molten powdered material over the stage to form the initial layer 202. The depositing of the layer of molten powdered material includes depositing one or more weld beads secured, each of the one or more weld beads being secured to each adjacent weld bead within the initial layer 202. The layer of molten powdered material is deposited to form the initial layer 202 having the preselected thickness 203 and the preselected shape, which includes the at least one first aperture 204.

After depositing the initial layer 202, the laser engineered net shaping process includes sequentially depositing one or more additional layers 222 over the initial layer 202 and/or any previously formed layers. Each weld bead in the one or more additional layers 222 is secured to each adjacent weld bead within the additional layer 222, as well as any adjacent layer of molten powdered material, such as, but not limited to, the initial layer 202. The additional layer(s) 222 are deposited with the second preselected thickness 223 and the second preselected shape, which includes the at least one second aperture 224 corresponding to the at least one first aperture 204 in the initial layer 202. The initial layer 202 and any additional layer(s) 222 form at least a portion of the net or near-net shape structure, such as, but not limited to, the structure 251 having the at least one final aperture 254.

The one or more powder feeders and/or the one or more powder delivery nozzles are configured to provide any suitable composition of the molten powdered material. Suitable compositions include, but are not limited to, similar or substantially similar compositions between layers, differing compositions between layers, gradient compositions within the structure, or a combination thereof. For example, gradient compositions within the structure may be formed by varying flow rate and/or compositions between material feeders, varying compositions within the feeders, or a combination thereof. In one embodiment, the flow rate for the powder material includes, for example, up to 5 g/min, between 0.1 and 5 g/min, between 0.5 and 4.5 g/min, or any combination, sub-combination, range, or sub-range thereof. In another embodiment, the directing of the focused energy beam and the metal alloy powder 201 is shielded by a shielding gas such as argon. Suitable shielding gas flow rates, include, but are not limited to, between 1 and 15 l/min, between 2 and 10 l/min, or any combination, sub-combination, range, or sub-range thereof.

Suitable focused energy sources for the laser engineered net shaping process include any focused energy source operating in a power range and travel speed for depositing the molten powdered material. In one embodiment, the power range of the focused energy source 210 in the laser engineered net shaping process includes, but is not limited to, between 100 and 3,000 watts, between 200 and 2,500 watts, between 300 and 2,000 watts, or any combination, sub-combination, range, or sub-range thereof. In another embodiment, the travel speed includes, but is not limited to, up to 300 mm/sec, between 1 and 300 mm/sec, between 4 and 250 mm/sec, or any combination, sub-combination, range, or sub-range thereof. For example, in a further embodiment, the focused energy source 210 operates in the power range of between 300 and 2,000 watts, at the travel speed of between 4 and 250 mm/sec. In another embodiment, a deposition rate for standard steels, titanium, and/or nickel alloys includes, for example, up to 1 kg/hour, up to 0.75 kg/hr, up to 0.5 kg/hour, between 0.1 and 0.5 kg/hour, up to 0.4 kg/hour, up to 0.3 kg/hour, or any combination, sub-combination, range, or sub-range thereof.

A powder size of the metal alloy powder 201 in the laser engineered net shaping process includes, but is not limited to, between about −120 and +325 mesh (0.044 and 0.125 mm). In one embodiment, a weld bead with of the laser engineered net shaping process includes, but is not limited to, between 0.1 and 2 mm, between 0.1 and 1.5 mm, between 0.25 and 1.25 mm, or any combination, sub-combination, range, or sub-range thereof. In another embodiment, a thickness of the initial layer of molten powdered material and/or any additional layers of molten powdered material formed in the laser engineered net shaping process includes, but is not limited to, between 0.1 and 2 mm, between 0.1 and 1.5 mm, between 0.2 and 1.5 mm, between 0.2 and 1.25 mm, between 0.4 and 1.25 mm, or any combination, sub-combination, range, or sub-range thereof. In a further embodiment, the initial layer 202 formed from the molten powdered material and at least one of the additional layer 222 formed from the molten powdered material includes a similar, substantially similar, or different thickness.

In one embodiment, the predetermined profile of the at least one aperture 254 formed with the additive method 100 is shaped to provide a fluid flow profile, such as for film cooling of a hot component. In one example, the predetermined profile of the at least one aperture 254 includes an arcuate-shaped profile. In another example, the predetermined profile of the at least one aperture 254 includes a conically shaped profile. Other examples include, but are not limited to, chevron-shaped profiles, circular-shaped profiles, ovular-shaped profiles, polygonal-shaped profiles, or combinations thereof. In another embodiment, the predetermined profile of the at least one aperture 254 includes an opening of at least 254 μm (0.010 inches), at least 381 μm (0.015 inches), at least 508 μm (0.020 inches), or any other combination, sub-combination, range, or sub-range thereof. In a further embodiment, the predetermined profile of the at least one aperture 254 forms an angle with a surface of the structure 251. The angle includes, for example, up to 90°, between 10° and 50°, about 30°, or any combination, sub-combination, range, or sub-range thereof, with 90° being the at least one aperture 254 perpendicular to the surface of the structure 251.

Figure 4:
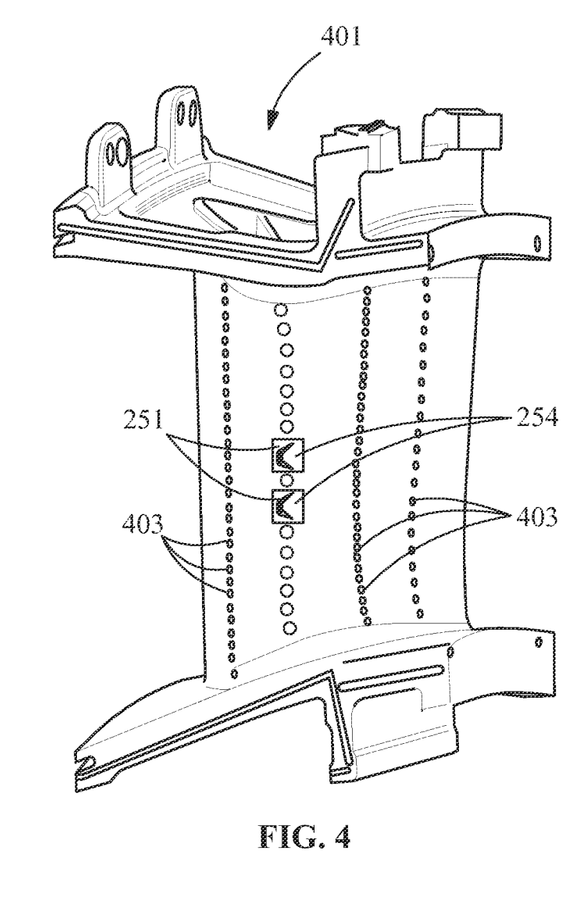
FIG. 4 is a perspective view of an article including a strip of additive manufacturing cooling holes secured thereto.
Figure 5:
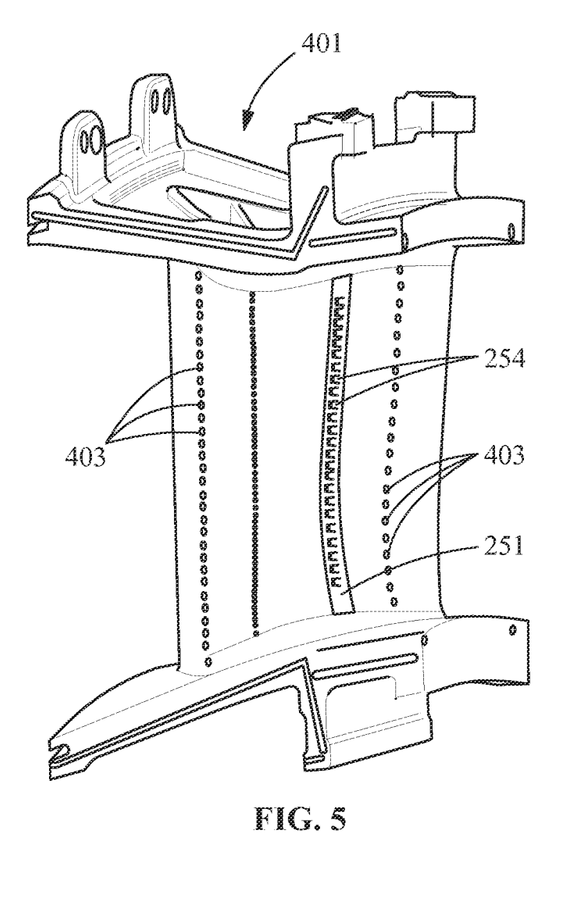
FIG. 5 is a perspective view of an article including individual additive manufacturing cooling holes secured thereto.

Referring to FIGS. 4-5, in one embodiment, the additive method 100 includes providing a substrate 401, such as a metallic substrate, and attaching the structure 251 to the substrate 401. In another embodiment, the substrate 401 forms at least a portion of an article that operates at elevated temperatures. Articles that operate at elevated temperatures include, but are not limited to, gas turbine components, such as buckets, nozzles, airfoils, or any other components requiring cooling holes. In a further embodiment, the article is either a new make or an existing article, such as, but not limited to, an article for repair or upgrade.

The substrate 401 includes any suitable composition based upon the article, and the structure 251 includes any suitable composition for attachment to the substrate 401. Suitable compositions for the substrate 401 include, but are not limited to, an alloy, such as a gamma prime superalloy or a stainless steel. In one embodiment, the gamma prime superalloy includes, for example, a composition, by weight, of about 9.75% chromium, about 7.5% cobalt, about 4.2% aluminum, about 3.5% titanium, about 1.5% molybdenum, about 6.0% tungsten, about 4.8% tantalum, about 0.5% niobium, about 0.15% hafnium, about 0.05% carbon, about 0.004% boron, and a balance nickel and incidental impurities. In another example, the gamma prime superalloy includes a composition, by weight, of about 7.5% cobalt, about 7.0% chromium, about 6.5% tantalum, about 6.2% aluminum, about 5.0% tungsten, about 3.0% rhenium, about 1.5% molybdenum, about 0.15% hafnium, about 0.05% carbon, about 0.004% boron, about 0.01% yttrium, and a balance nickel and incidental impurities. In another example, the gamma prime superalloy includes a composition, by weight, of between about 8.0% and about 8.7% Cr, between about 9% and about 10% Co, between about 5.25% and about 5.75% Al, up to about 0.9% Ti (for example, between about 0.6% and about 0.9%), between about 9.3% and about 9.7% W, up to about 0.6% Mo (for example, between about 0.4% and about 0.6%), between about 2.8% and about 3.3% Ta, between about 1.3% and about 1.7% Hf, up to about 0.1% C (for example, between about 0.07% and about 0.1%), up to about 0.02% Zr (for example, between about 0.005% and about 0.02%), up to about 0.02% B (for example, between about 0.01% and about 0.02%), up to about 0.2% Fe, up to about 0.12% Si, up to about 0.1% Mn, up to about 0.1% Cu, up to about 0.01% P, up to about 0.004% S, up to about 0.1% Nb, and a balance nickel and incidental impurities.

Suitable compositions for the structure 251 formed by the additive method 100 include, but are not limited to, an alloy, such as a stainless steel, a superalloy, or a cobalt based alloy. In one embodiment, the structure 251 is attached to a cooled region of the substrate 401, which reduces the temperatures the structure 251 is exposed to. In another embodiment, the cobalt based alloy includes, for example, 70Co-27Cr-3Mo. In a further embodiment the superalloy includes, but is not limited to, an iron-based superalloy, a nickel-based superalloy, or a combination thereof.

Suitable iron-based superalloys include, but are not limited to, a composition, by weight, of between about 50% and about 55% nickel+cobalt, between about 17% and about 21% chromium, between about 4.75% and about 5.50% columbium+tantalum, about 0.08% carbon, about 0.35% manganese, about 0.35% silicon, about 0.015% phosphorus, about 0.015% sulfur, about 1.0% cobalt, between about 0.35% and about 0.80% aluminum, between about 2.80% and about 3.30% molybdenum, between about 0.65% and about 1.15% titanium, between about 0.001% and about 0.006% boron, 0.15% copper, and a balance iron and incidental impurities.

Suitable nickel-based superalloys include, but are not limited to, a composition, by weight, of between about 0.15 and about 0.20% carbon, between about 15.70% and about 16.30% chromium, between about 8.00% and about 9.00% cobalt, between about 1.50% and about 2.00% molybdenum, between about 2.40% and about 2.80% tungsten, between about 1.50% and about 2.00% tantalum, between about 0.60% and about 1.10% columbium, between about 3.20% and about 3.70% titanium, between about 3.20% and about 3.70% aluminum, between about 0.005% and about 0.015% boron, between about 0.05% and about 0.15% zirconium, up to about 0.50% iron, up to about 0.20% manganese, up to about 0.30% silicon, up to about 0.015% sulfur, and a balance nickel and incidental impurities; a composition, by weight, of about 5% iron, between about 20% and about 23% chromium, up to about 0.5% silicon, between about 8% and about 10% molybdenum, between about 3.15% and 4.15% Nb+Ta, up to about 0.5% manganese, up to about 0.1% carbon, and a balance nickel and incidental impurities; a composition, by weight, of about 20% chromium, about 10% cobalt, about 8.5% molybdenum, up to about 2.5% titanium, about 1.5% aluminum, up to about 1.5% iron, up to about 0.3% manganese, up to about 0.15% silicon, about 0.06% carbon, about 0.005% boron, and a balance nickel and incidental impurities; a composition, by weight, of about 18% to about 20% chromium, about 9.0% to about 10.5% molybdenum, about 10% to about 12% cobalt, about 1.4% to about 1.8% aluminum, about 3.0% to about 3.3% titanium, about 0.003% to about 0.01% boron, about 0.12% carbon, about 5.0% iron, about 0.10% manganese, about 0.50% silicon, about 0.015% sulfur, about 0.50% copper, and a balance nickel and incidental impurities; a composition containing, by weight, about 22% chromium, about 14% tungsten, about 2% molybdenum, a maximum of about 3% iron, a maximum of about 5% cobalt, about 0.5% manganese, about 0.4% silicon, about 0.3% aluminum, about 0.10% carbon, about 0.02% lanthanum, a maximum of about 0.015% boron, and a balance nickel and incidental impurities; and/or a composition, by weight, of between about 19.0% and about 21.0% chromium, between about 19.0% and about 21.0% cobalt, between about 5.6% and about 6.1% molybdenum, between about 1.9% and about 2.4% titanium, between about 0.04% and about 0.08% carbon, a maximum of about 0.4% silicon, a maximum of about 0.6% manganese, a maximum of about 0.45% aluminum, a maximum of 0.005% boron, a maximum of 0.20% copper, a maximum of 0.7% iron, and a balance nickel and incidental impurities.

The structure 251 and the substrate 401 are compatible. Preferably, when the substrate 401 is a stainless steel, the structure 251 is also a stainless steel. Similarly, if the substrate 401 is a gamma prime superalloy the structure 251 is also a gamma prime superalloy.

Attaching the structure 251 to the substrate 401 includes processes such as, but not limited to, brazing, welding, diffusion bonding, or a combination thereof. In one embodiment, when attaching the structure 251 to the substrate 401 includes brazing, a braze material, such as a boron-nickel alloy and/or a silicon nickel alloy, is used. In another embodiment, when attaching the structure 251 to the substrate 401 includes welding the structure 251 to a gamma prime superalloy, a weld filler material, such as a filler material having a composition, by weight, of about 0.015% boron, about 0.05% to about 0.15% carbon, about 20% to about 24% chromium, about 3% iron, about 0.02% to about 0.12% lanthium, about 1.25% manganese, about 20% to about 24% nickel, about 0.2% to about 0.5% silicon, about 13% to about 15% tungsten, and a balance cobalt; and/or a composition, by weight, of about 22% chromium, about 16% iron, about 9% molybdenum, about 1.5% cobalt, about 0.6% tungsten, about 0.10% carbon, about 1% manganese, about 1% silicon, about 0.008% boron and a balance nickel and incidental impurities is used. In another embodiment, when attaching the structure 251 to the substrate 401 includes welding the structure 251 to a stainless steel, the weld filler material includes a stainless steel.

Figure 7:
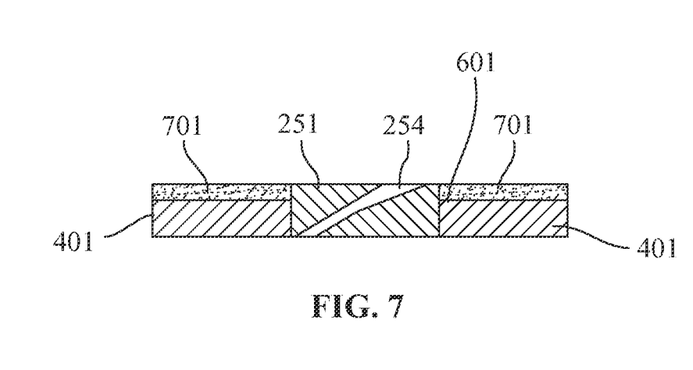
FIG. 7 is a cross section of an additive manufacturing shaped and metered cooling hole secured to a coated article, according to an embodiment of the disclosure.
Figure 8:
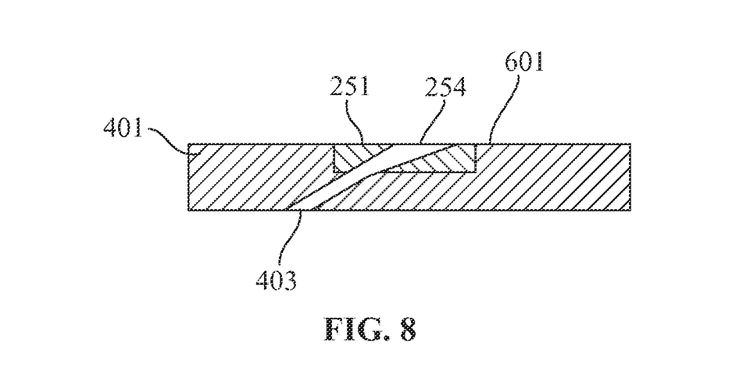
FIG. 8 is a cross section of an additive manufacturing shaped cooling hole secured over a metered hole in an article, according to an embodiment of the disclosure.
Figure 9:
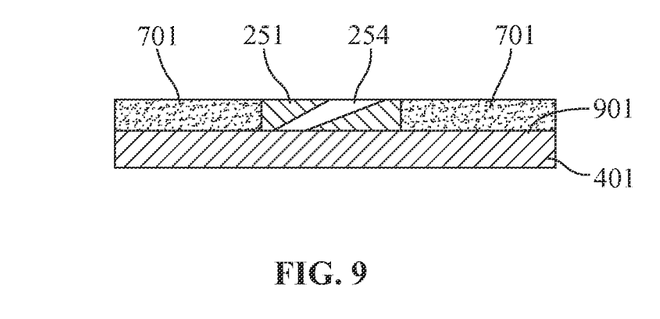
FIG. 9 is a cross section of an additive manufacturing shaped cooling hole secured over a metered hole in a coated article, according to an embodiment of the disclosure.

Referring to FIGS. 6-9, the structure 251 is either attached to a modified surface 601 of the substrate 401 (FIGS. 6-8), or over an outer surface 901 of the substrate 401 (FIG. 9). The modified surface 601 includes a feature for accepting the structure 251, the feature corresponding to the predetermined thickness and the predetermined shape of the structure 251. When positioned in the feature, the structure 251 is recessed from, flush with, or extends past the outer surface 901. Suitable features include, but are not limited to, a channel, a recess, a slot, an opening, or any other modification for at least partially receiving the structure 251 therein.

Figure 6:
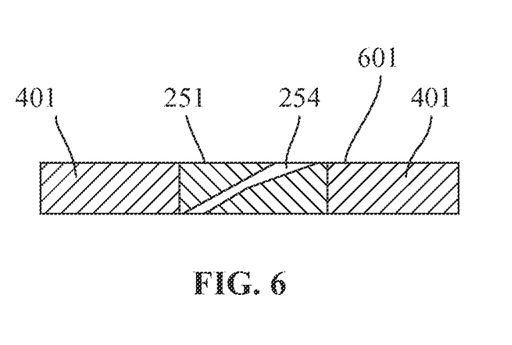
FIG. 6 is a cross section view of an additive manufacturing shaped and metered cooling hole secured to an article, according to an embodiment of the disclosure.

In one embodiment, the modified surface 601 is formed during manufacture of the substrate 401. In another embodiment, the modified surface 601 is formed after manufacture of the substrate 401, such as, for example, through machining of the outer surface 901 to form the feature. In a further embodiment, when the article includes the existing article, the modified surface 601 is formed by removing existing apertures, machining the existing article to form the feature, and/or cleaning the existing article for direct attachment.

Each of the structures 251 includes any suitable number of the final apertures 254. Based upon the number of final apertures 254, more than one of the structures 251 may be attached to the substrate 401. For example, as shown in FIG. 4, two of the structures 251 are attached to the substrate 401, each of the structures 251 including one of the final apertures 254. In another example, as shown in FIG. 5, one of the structures 251 is attached to the substrate 401, the structure 251 including a plurality of the final apertures 254.

Each of the at least one final apertures 254 provides a passageway for fluid through the structure 251. When required, to extend the passageway through the substrate 401 and form the cooling hole, each of the at least one final apertures 254 is coupled to a corresponding metered hole 403. In one embodiment, both the at least one final aperture 254 and the metered hole 403 are formed in the structure 251, and extend entirely through the substrate 401 (FIGS. 6 and 7). In an alternate embodiment, the at least one final aperture 254 is positioned over the metered hole 403 formed in the substrate 401 (FIG. 8). In another alternate embodiment, the structure 251 is attached to the substrate 401 (FIG. 9), then the metered hole 403 is formed in the substrate 401. In yet another alternate embodiment, a portion of the metered hole 403 is formed in the structure 251, and the rest of the metered hole 403 is formed in the substrate 401 either before or after attaching the structure 251. When the metered hole 403 is formed in the substrate 401 after the structure 251 is attached, the metered hole 403 is formed through the at least one final aperture 254. Forming the metered hole 403 in the substrate 401 includes any suitable process, such as, but not limited to, drilling.

In one embodiment, the additive method 100 includes applying a coating 701, such as a bond coat and/or a thermal barrier coating (TBC), to the substrate 401. The bond coat includes any suitable bond coat, such as, but not limited to, a MCrAlY bond coat. The coating 701 is either applied before or after attaching the structure 251 to the substrate 401. For example, in another embodiment, the structure 251 is attached to the substrate 401, the at least one final aperture 254 is masked, and then the bond coating and/or the TBC is sprayed over the exposed base metal. Alternatively, the coating 701 is applied to the substrate 401, and then removed from an area to facilitate attachment of the structure 251.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for making shaped cooling holes in an article, comprising the steps of:
   providing a metal alloy powder;
   forming an initial layer with the metal alloy powder, the initial layer having a preselected thickness and a preselected shape, the preselected shape including at least one aperture;
   sequentially forming an additional layer over the initial layer with the metal alloy powder, the additional layer having a second preselected thickness and a second preselected shape, the second preselected shape including at least one aperture corresponding to the at least one aperture in the initial layer;
   joining the additional layer to the initial layer, forming a structure having a predetermined thickness, a predetermined shape, and at least one aperture having a predetermined profile;
   providing a substrate; and
   attaching the structure to the substrate.

2. The method of claim 1, further comprising repeating the steps of sequentially forming the additional layer over a previously formed layer and joining the additional layer to the previously formed layer, each of the additional layers increasing the thickness of the structure until the predetermined thickness is obtained.

3. The method of claim 1, further comprising the additional steps of:
   masking the at least one aperture having the predetermined profile; and
   applying a coating over an exposed surface of the structure attached to the substrate.

4. The method of claim 1, comprising the additional step of forming metering holes in the substrate through the at least one aperture having a predetermined profile, the metering holes providing a passageway for fluid through the attached structure, the passageway including the at least one aperture having the predetermined profile.

5. The method of claim 1, wherein the structure is attached to the substrate by a process selected from the group consisting of welding, brazing, and diffusion bonding.

6. The method of claim 1, wherein the structure is attached over an outer surface of the substrate.

7. The method of claim 1, further including a step of modifying a surface of the substrate to provide a channel corresponding to and accepting the structure.

8. The method of claim 1, wherein the predetermined profile of the at least one aperture is an arcuate-shaped profile.

9. The method of claim 1, wherein the predetermined profile of the at least one aperture is a conically-shaped profile.

10. The method of claim 1, wherein the predetermined profile of the at least one aperture has an opening of at least 254 μm (0.010 inches).

11. The method of claim 1, wherein the predetermined profile of the at least one aperture forms an angle with a surface of the structure, the angle being selected from the group consisting of up to 90°, between 10° and 50°, and about 30°, wherein 90° is an aperture that is perpendicular to the surface of the structure.

12. The method of claim 1, wherein the initial layer and each additional layer is formed to a thickness in the range of 20-100 μm (0.0008-0.004 inches).

13. The method of claim 1, wherein the structure is provided with a predetermined thickness in the range of 250-6350 μm (0.010-0.250 inches).

14. The method of claim 1, wherein the substrate comprises an alloy selected from the group consisting of gamma prime superalloys and stainless steels.

15. The method of claim 1, wherein the structure comprises an alloy selected from the group consisting of stainless steels, superalloys, and cobalt based alloys.

16. The method of claim 1, wherein the step of forming the initial layer further comprises the steps of:
   depositing the metal alloy powder forming an initial powder layer;
   providing a focused energy source; and then
   melting the metal alloy powder of the initial powder layer with the focused energy source, transforming the initial powder layer to the initial layer.

17. The method of claim 1, further including the additional steps of, after forming the structure:

hot isostatically pressing the structure at an elevated temperature and elevated pressure sufficient to further consolidate the structure; and then solutionizing the structure at an elevated temperature and for a time sufficient for distributing segregated alloying elements within the structure.

18. The method of claim 11, wherein the predetermined profile of the at least one aperture forms an angle with a surface of the structure, the angle being selected from the group consisting of between 10° and 50°, and about 30°.

* * * * *